(12) United States Patent
Takahashi et al.

(10) Patent No.: US 6,445,871 B1
(45) Date of Patent: Sep. 3, 2002

(54) IMAGE OUTPUTTING APPARATUS

(75) Inventors: Koji Takahashi; Kiyohisa Sugishima; Hiroyuki Kasuga; Yoshihiro Takada; Toshihiko Nishikori, all of Kanagawa-ken; Eiichi Motoyama; Hiroaki Furuyama, both of Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/760,606

(22) Filed: Dec. 4, 1996

Related U.S. Application Data

(62) Division of application No. 08/237,633, filed on May 4, 1994.

(30) Foreign Application Priority Data

May 12, 1993 (JP) .............................................. 5-133948

(51) Int. Cl.[7] ................................................ H04N 7/00
(52) U.S. Cl. ...................................................... 386/46
(58) Field of Search ............................. 386/1, 46, 121; 400/50; 358/906, 909.1; 347/2; H04N 5/76

(56) References Cited

U.S. PATENT DOCUMENTS

| | | | | |
|---|---|---|---|---|
| 4,703,366 A | * | 10/1987 | Kobori et al. | 358/335 |
| 4,920,423 A | * | 4/1990 | Shiota | 358/335 |
| 5,019,915 A | * | 5/1991 | Fujito | 358/335 |
| 5,209,582 A | * | 5/1993 | Bessho et al. | 400/50 |
| 5,258,880 A | * | 11/1993 | Takahashi | 360/79 |
| 5,444,544 A | * | 8/1995 | Oka et al. | 358/332 |
| 5,608,536 A | * | 3/1997 | Takahashi | 386/46 |
| 5,926,285 A | * | 7/1999 | Takahashi | 358/296 |

FOREIGN PATENT DOCUMENTS

JP        403186082 A    *  8/1991   ............ H04N/5/91

* cited by examiner

*Primary Examiner*—Vincent Boccio
(74) *Attorney, Agent, or Firm*—Robin, Blecker & Daley

(57) ABSTRACT

An image outputting apparatus is provided with a reproduction circuit for reproducing moving images from a recording medium by operating a recording-medium transport circuit, a recording circuit for recording on a recording substance an image for one picture included in the moving images by operating a feeding circuit which feeds the recording substance, and a control circuit arranged to control the feeding circuit to feed the recording substance to a predetermined position so as to shift a recording position on the recording substance, while controlling the recording-medium transport circuit to transport the recording medium to a predetermined position, and to control. the recording medium-transport circuit and the recording circuit in an interlocked manner so as to record the image for one picture on the recording substance. The arrangement of these parts in combination permits reduction in capacity of an image memory and also in processing time of the apparatus.

30 Claims, 8 Drawing Sheets

IMAGE OUTPUTTING APPARATUS

This application is a division, of application Ser. No. 08/237,633, filed May 4, 1994.

BACKGROUND OF THE INVENTION

1. Field of the Invention

This invention relates to an image outputting apparatus and more particularly to an apparatus arranged to be capable of recording a plurality of images on a single sheet of printing paper.

2. Description of the Related Art

It has heretofore been practiced to record a plurality of images on one and the same sheet of printing paper. The conventional video printer machine or the conventional electrophotographic process type printer machine using a laser beam source has been arranged to carry out such printing by combining a plurality of images on a memory to form a composite image signal beforehand, to supply the composite image signal in a mass to the printer machine and to record the plurality of images on one sheet of printing paper through a printing process.

Therefore, the conventional image outputting apparatus has necessitated use of a memory of such a large capacity that permits storing an amount of image data for one sheet of printing paper according to the picture element resolution of the printing means. However, the use of such a memory has incurred an increase in size or complicated arrangement of the apparatus.

Further, it is also necessary to store the data on the memory by designating images one after another. In a case where images obtained from a VTR are to be outputted, for example, the printing work begins at a point of time when the designating work on all images is completed after a long process of designating images throughout a whole VTR tape. Therefore, the overall processing time of the apparatus has been affected by the conventional method.

SUMMARY OF THE INVENTION

It is a general object of this invention to provide an image outputting apparatus which is arranged to solve the problems of the prior art described above.

It is a more specific object of this invention to provide an image outputting apparatus which is arranged to permit reduction in memory capacity. To attain this object, an image outputting apparatus arranged according to this invention as an embodiment thereof comprises reproduction means for reproducing moving images from a recording medium, the reproduction means including recording-medium transport means for transporting the recording medium, recording means capable of recording on a recording substance a predetermined image for one picture included in the moving images, the recording means including feeding means for feeding the recording substance, and control means for controlling the recording-medium transport means and the recording means in an interlocking manner, the control means being arranged to control the feeding means to feed the recording substance to a predetermined position so as to shift a recording position on the recording substance while controlling the recording-medium transport means to transport the recording medium to a predetermined position, and to cause the image for one picture to be recorded on the recording substance.

It is another object of this invention to provide an image outputting apparatus arranged to permit reduction in processing time. To attain that object an image outputting apparatus arranged as another embodiment of this invention comprises reproduction means for reproducing image signals, a memory capable of storing an image signal for one picture included in the reproduced image signals, recording means for recording on a recording substance an image corresponding to the image signal for one picture as a visible image, and control means for causing a plurality of images each for one picture to be recorded on the recording substance by controlling the reproduction means, the memory and the recording means in an interlocking manner, so as to repeatedly perform an operation of storing in the memory the image signal for one picture included in the image signals reproduced by the reproduction means, reading out from the memory the image signal for one picture stored in the memory and recording on the recording substance an image corresponding to the image signal for one picture.

These and other objects and features of this invention will become apparent from the following detailed description of embodiments thereof taken in connection with the accompanying drawings.

DETAILED DESCRIPTION OF THE PREFERRED EMBODIMENTS

The following describes a first embodiment of this invention with reference to the related drawings,.

Figure 1:
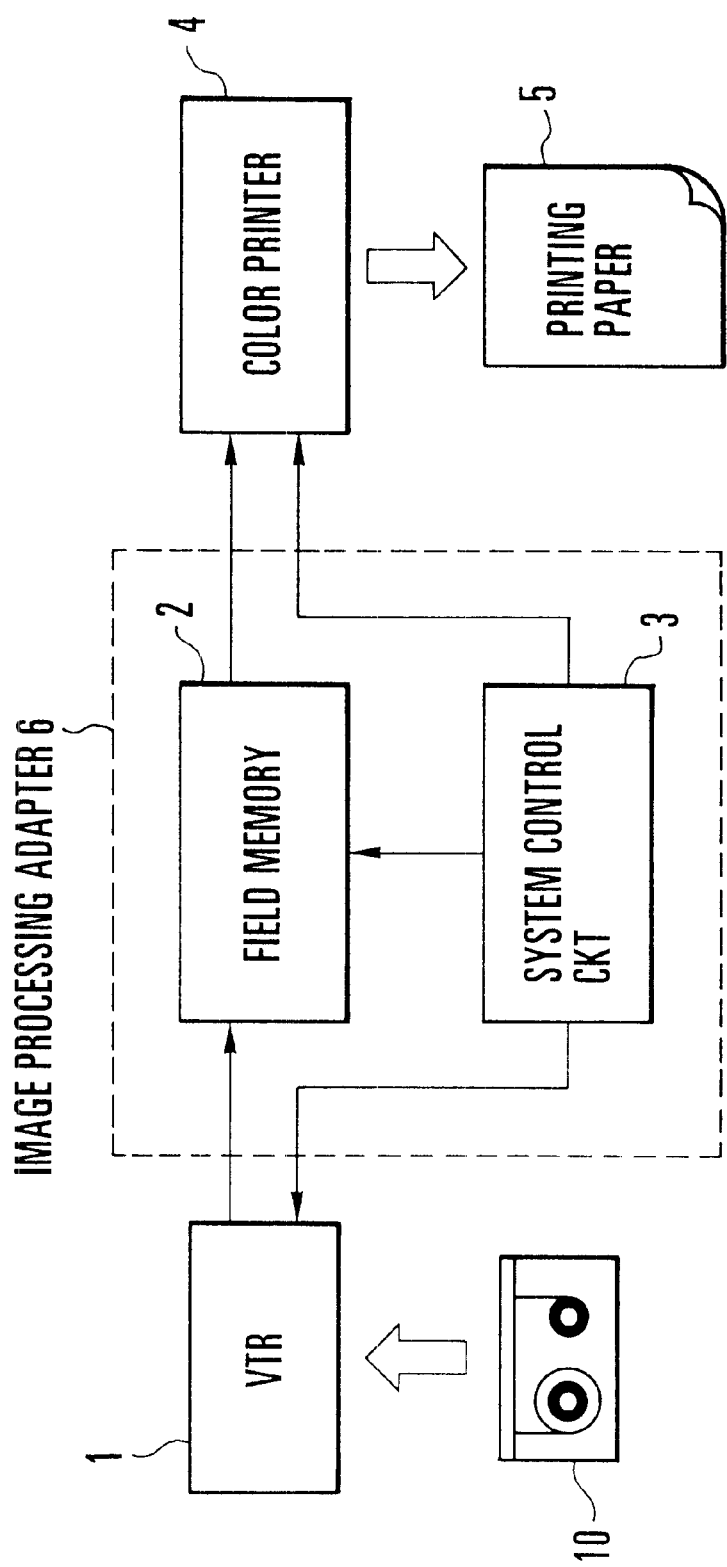
FIG. 1 is a block diagram showing the arrangement of an image outputting apparatus arranged as a first embodiment of this invention.

FIG. 1 shows in outline the arrangement of an image outputting apparatus which is arranged according to this invention as the first embodiment thereof. Referring to FIG. 1, in the apparatus, image signals recorded on a video tape 10 which is a recording medium are arranged to be reproduced by a video tape recorder (hereinafter referred to as VTR) 1. A color printer 4 which is of a printing head moving type is arranged to perform printing on a printing paper 5. A thermal bubble type ink jet printer is employed as the color printer 4.

An image processing adapter 6 which is composed of a field memory 2 and a system control circuit 3 is. arranged to control the VTR 1 and the color printer 4 in an interlocking manner so as to carry out printing, for example, as will be described later referring to FIG. 3.

Figure 2:
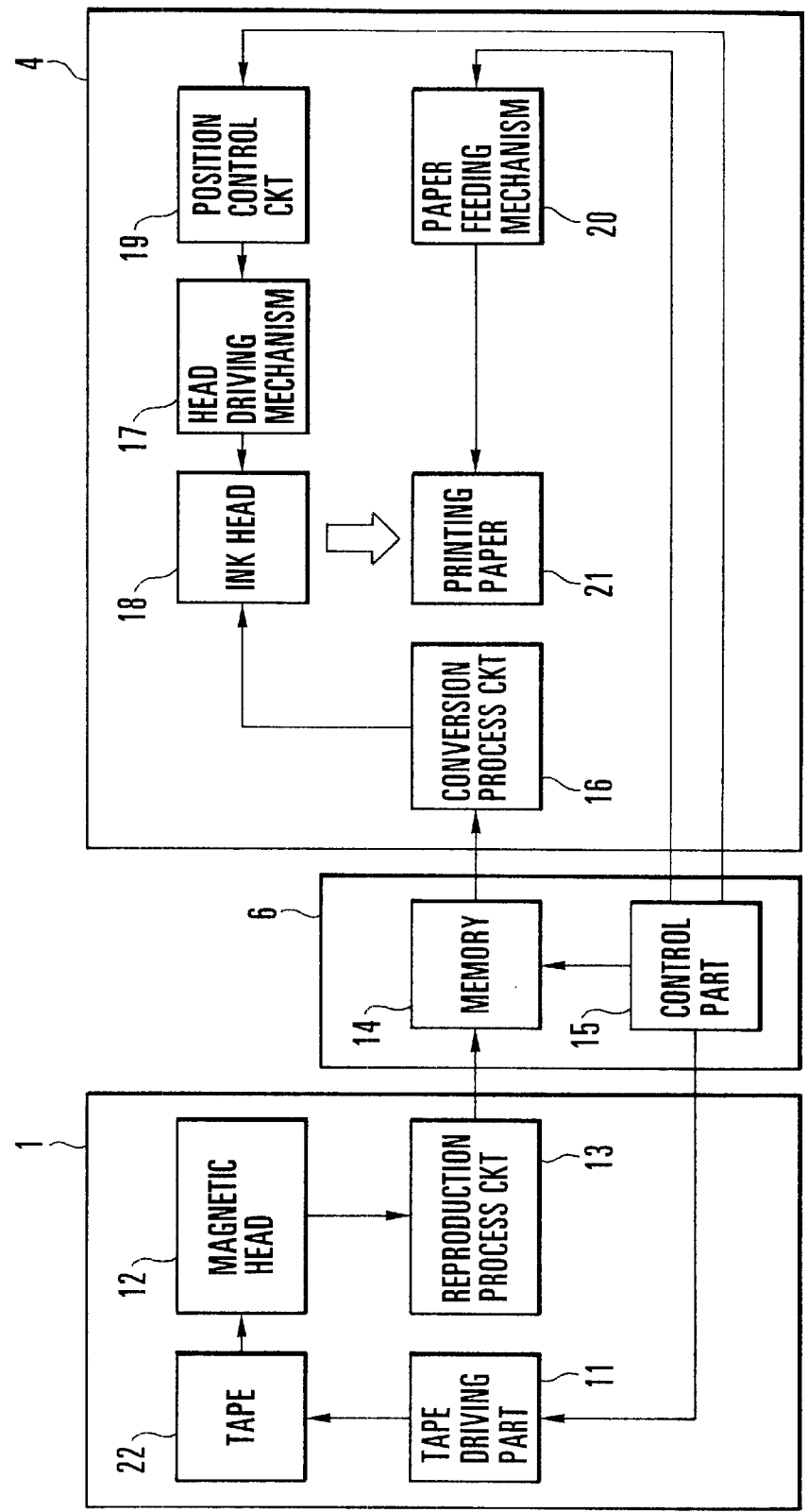
FIG. 2 is a block diagram showing in, detail the arrangement of the apparatus shown in FIG. 1.

FIG. 2 shows in a block diagram the details of the arrangement of the image outputting apparatus which is arranged as the first embodiment of this invention. As shown, in the image outputting apparatus, a video tape 22 is controlled to be transported at a normal travel speed (×1) from the beginning by a tape driving part 11. An image signal reproduced by the magnetic head 12 is processed in a predetermined manner at a reproduction process circuit 13. A control part 15 then controls a field memory 14 to store the processed image signal therein at a point of time "0" which is shown by a dashed line in FIG. 4.

Next, the image signal for one field stored in the memory 14 is read out from the memory 14 and supplied to a conversion process circuit 16 to convert the image signal from the RGB signal of a video system into the YMC signal of a print system. A signal thus obtained through the conversion is subjected to a predetermined necessary process for printing and is then supplied to an ink head 18. The ink head 18 is operated to print an image corresponding to the converted image signal on a printing paper 21. After completion of the printing, the printing process stands ready for a next instruction for printing. The printing position of the ink head 18 is controlled by a head driving mechanism 17 which is arranged to operate under the control of a position control circuit 19.

Upon completion of the printing process, a paper feeding process is performed to drive and move the printing paper 21 by a paper feeding mechanism 20 to an initial printing position for a next picture.

Figure 4:
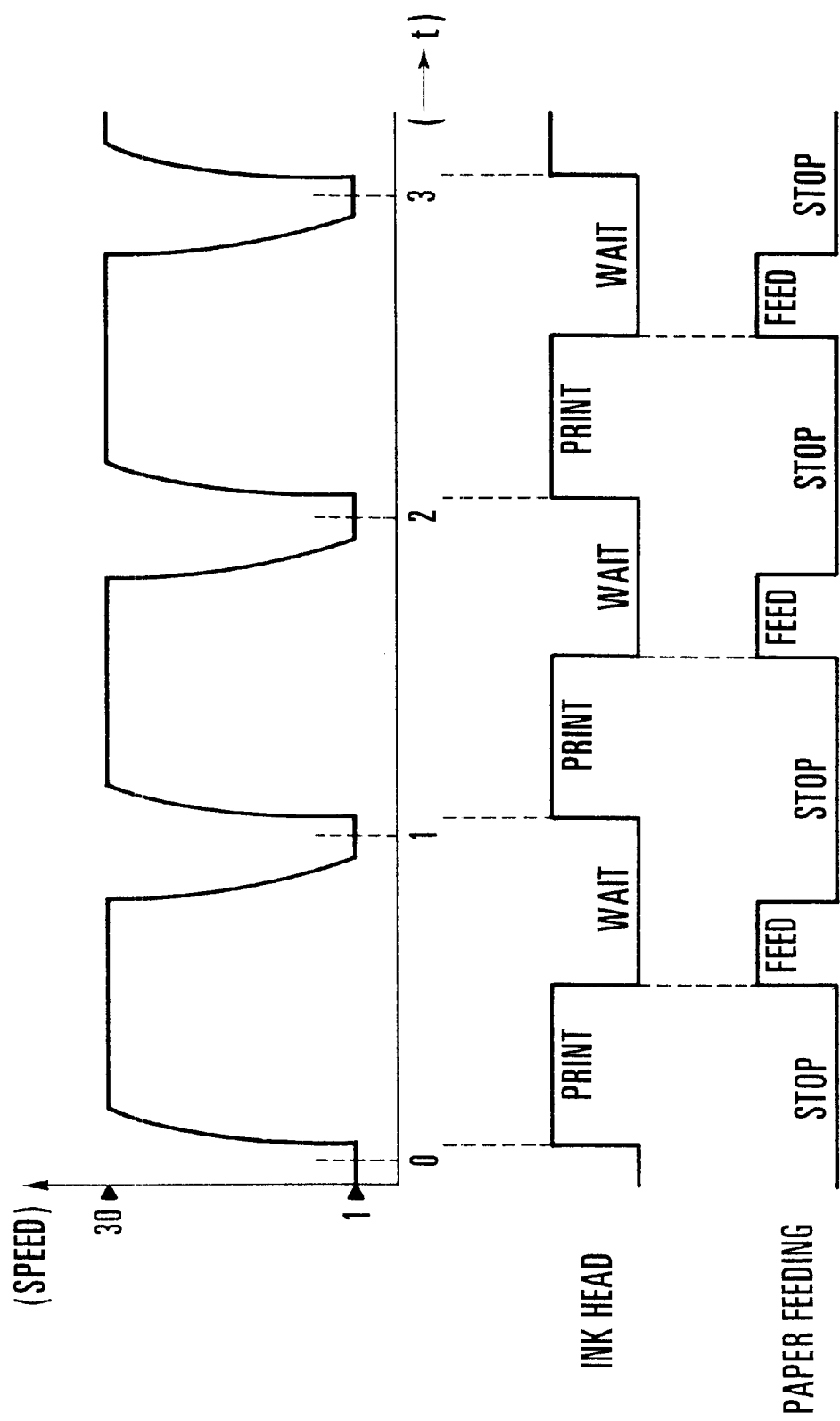
FIG. 4 is a time chart showing the operation of the apparatus shown in FIG. 2.

A search for the next picture is made by moving the tape 22 at a high speed while the printing and paper feeding actions are in process. The search for the next picture is made under the control of the control part 15 at a speed which is, for example, about 30 times as fast as the normal travel speed for the purpose of saving time. The processes of the various parts mentioned above are carried out in association with each other as shown in FIG. 4.

Figure 3:
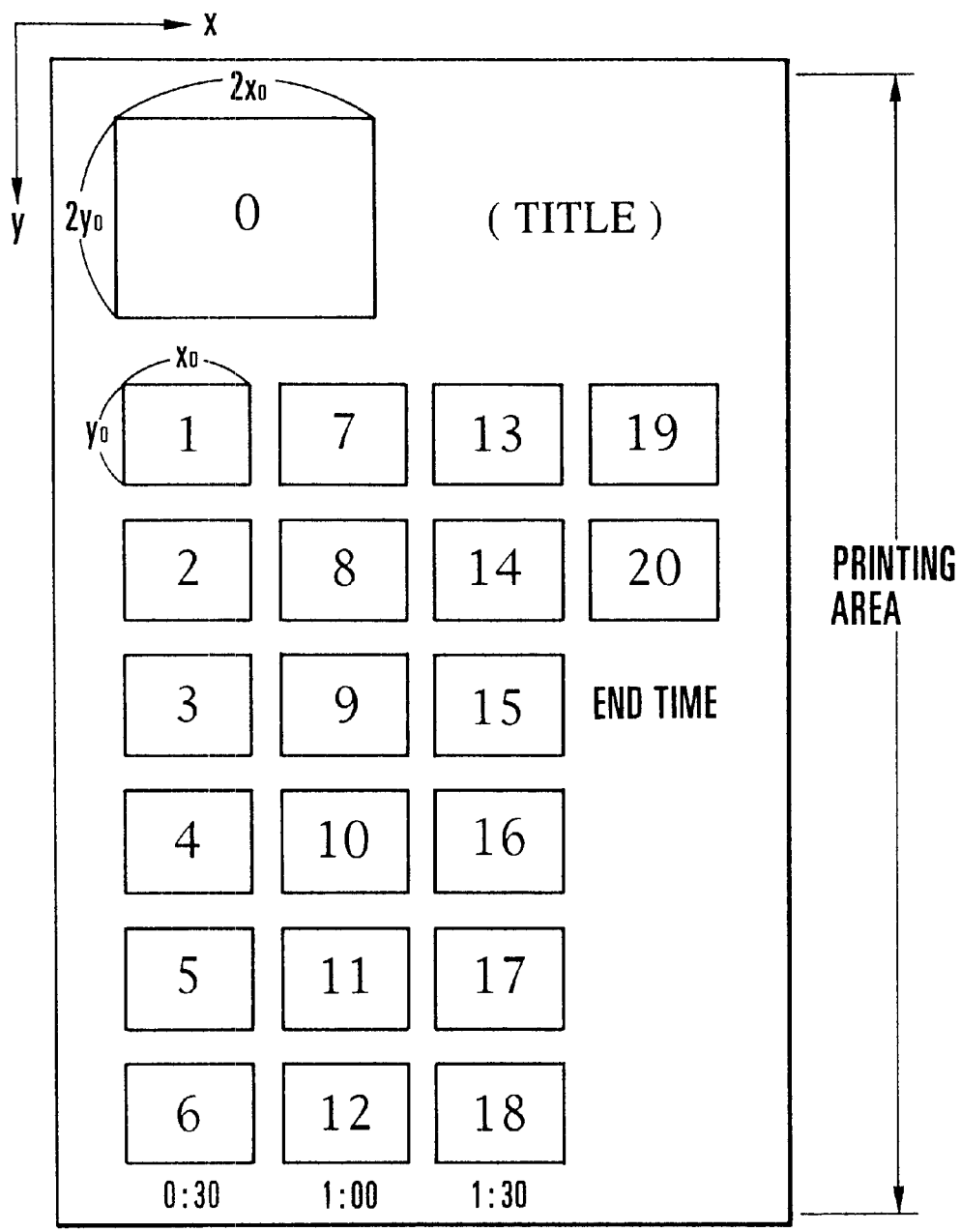
FIG. 3 shows a printing layout in the embodiment of this invention.

FIG. 3 shows by way of example an arrangement for printing a plurality of images on one and the same sheet of printing paper on the basis of a plurality of image signals outputted from the VTR 1. In this case, a total of 21 pictures are printed including pictures from a picture No. 0, which is a leader picture, through a picture No. 20.

The picture No. 0 is printed in a size which is four times in area as large as each of other pictures from No. 1 through No. 20. Each of the small pictures from No. 1 through No. 20 is assumed to be in a basic printing size, for the sake of simplification of description. For this basic printing size, the printing ink head 18 is arranged to be capable of printing by scanning once in the direction of x axis.

As for the picture No. 0 which is a larger picture is printed in the following manner. An upper half part of the picture No. 0 is first printed by a first scan in the direction of x axis. The printing paper is then fed in the direction of y axis by an amount yo. The lower half part of the picture No. 0 is printed by a second scan in the x axis direction to complete the printing. For the purpose of visually grasping in outline the contents of records provided on the tape 22, an index print is prepared, for example, in a manner as described below. Procedures for preparation of the above-stated index print are described here on the assumption that a video tape to be used is arranged to permit recording video images for a period of 120 minutes. An image in the leader part of the tape 22 is first printed in an area No. 0 as a title picture. The title of the tape cassette is printed, if necessary, within a margin available on the right hand side of the title picture. Next, the tape 22 is transported as much as a predetermined amount and, a picture is printed as a picture No. 1. After that, one picture is printed every time the tape 22 is transported by the same predetermined amount. Assuming that the predetermined amount of tape transportation corresponds, for example, to five minutes (an amount of 300 fields according to the NTSC system), the tape 22 comes to a position where 30 minutes has elapsed when a picture No. 6 is printed. Then, "0:30" is printed below the picture No. 6 (at the bottom of the first column) to indicate the lapse of 30 minutes, as shown in FIG. 3.

After that, the ink head 18 is moved to a datum printing position for the second column. The pictures from No. 7 to No. 12 are then printed with "1:00" printed below the picture No. 12 to indicate the lapse of one hour. The process of printing-is carried on in the same manner for the third column and also for other subsequent columns.

In a case where an amount of images corresponding to 98 minutes has been recorded on the 120 minute tape, since the printing is performed for pictures recorded at intervals of five minutes,. it can be expressed as 98=5×19+3. With the picture corresponding to 0 minute assumed to be a picture No. 0, a picture No. 1, a picture No. 2, - - - are serially assigned at intervals of five minutes until a picture No. 19 is obtained when 95 minutes elapse.

Next, upon detection of an unrecorded tape part, a picture obtained at the end of 98 minutes is printed as a picture No. 20. Words "END TIME 98 MIN" is then printed below the picture No. 20.

In a case where a plurality of pictures are to be printed as shown in FIG. 3, each part shown in FIG. 2 operates in a state of being interlocked with others as described below with reference to FIGS. 4 and 5.

FIG. 4 shows the timing of movement of the tape 22, the ink head 18 and the printing paper 21. Referring to FIG. 4, the upper part thereof shows tape feeding speeds. An axis of ordinate indicates a speed "1" which is assumed to be a normal reproduction speed and a maximum speed "30" which is assumed to be 30 times as fast as the normal reproduction speed and to be used for fast tape feeding. An axis of abscissa indicates a time base.

The middle part of FIG. 4 shows the timing of driving the ink head 18 by the position control circuit 19 in the direction of the x axis (shown in FIG. 3). The lower part of FIG. 4 shows the timing of feeding the printing paper 21. Further, the axis of abscissa of the upper part of FIG. 4 shows the lapse of time which applies in common to the upper, middle and lower parts of FIG. 4. The axis of abscissa thus shows a relation obtained among a transporting action on the tape 22, a driving action on the ink head 18 and a moving action on the printing paper 21.

Figure 5:
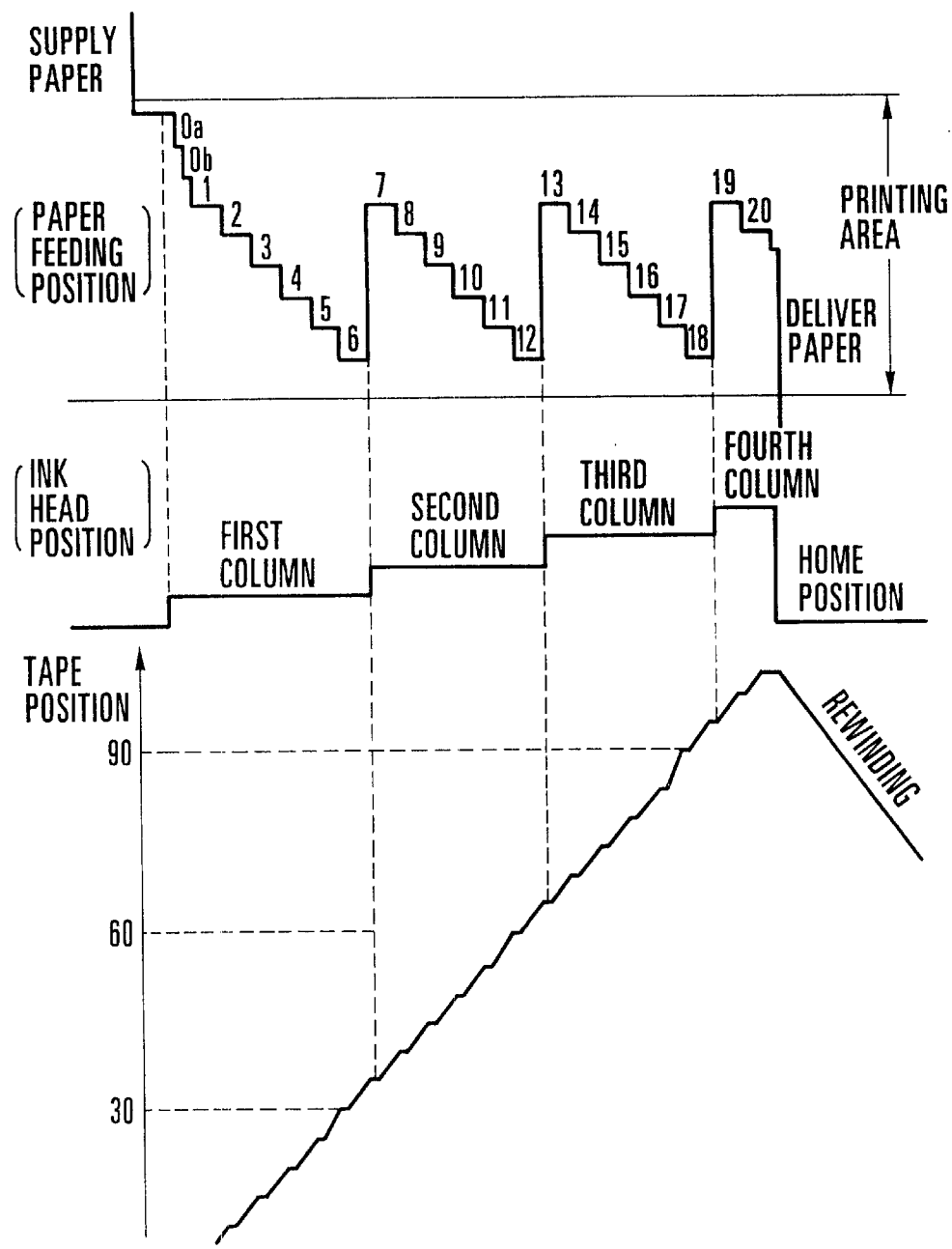
FIG. 5 shows a relation obtained among a paper feeding position, an ink head position and a tape position in relation to each other.

FIG. 5 shows in a timing chart how the positions of the tape 22, the ink head 18 and the printing paper 21 are controlled for the processes of the whole apparatus. The upper part of FIG. 5 shows the state of position control over the printing paper 21. In the upper part of FIG. 5, the axis of ordinate indicates the positions of the ink head 18 obtained in the y axis direction. The middle part of FIG. 5 shows the datum position of the ink head 18 obtained in the x axis direction for each column of pictures. The lower part of FIG. 5 shows the positions of the tape 22 beginning with its leader position in the form of values reduced to reproduction time.

Further, the process of paper feeding shown in the upper part of FIG. 5 begins at the left end of the time base (the axis of abscissa). A printing area indicated with arrows exists between the paper supply indicated at the left end and the paper delivery indicated at the right end of the time base.

The printing area is likewise shown also in FIG. 3. Numerals indicating the steps of paper feeding represent picture numbers. Since the picture No. 0 is two times larger than other pictures both in the vertical and horizontal directions, the picture No. 0 alone requires two steps 0a and 0b of paper feeding.

Figure 6:
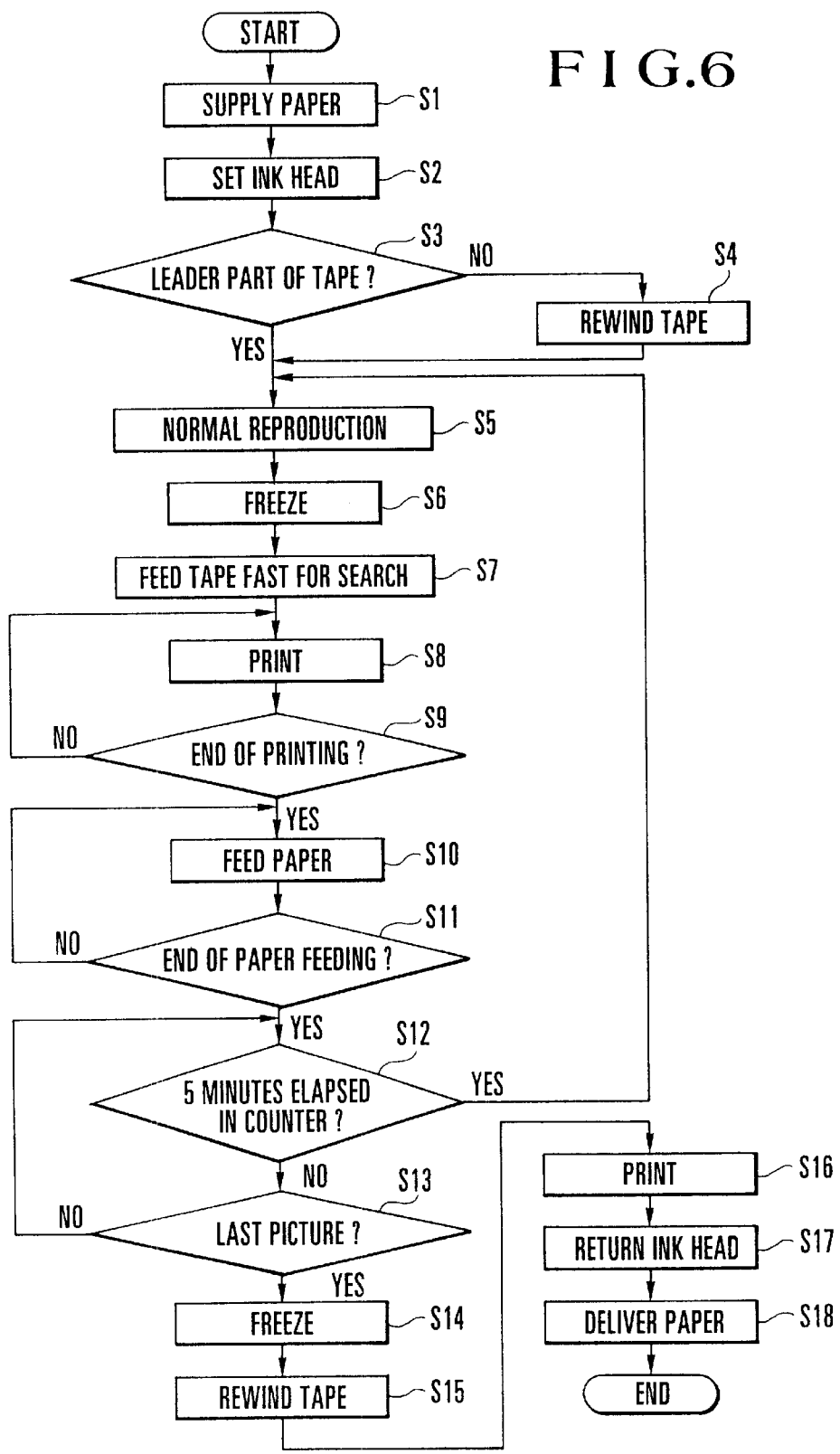
FIG. 6 is a flow chart showing the operation of the apparatus shown in FIG. 2.

FIG. 6 shows the flow of the actions described above. Referring to FIG. 6, the apparatus is supplied with the printing paper at a step S1. At a step S2, the ink head 18 is set in the printing area. The flow then comes to a step S3 to make a check to find if the tape 22 is at its leader part. If the tape 22 is found to be not at the leader part but midway between its two ends, the flow comes to a step S4. At the step S4, the control part 15 causes the tape 22 to be rewound. If the tape 22 is found-to be at its leader part at the step S3, the flow proceeds to a step S5 to perform control for reproduction at a normal speed. At a step S6, a freeze processis performed, i.e., a process of storing an image signal for one picture in the field memory 14 is performed. Upon completion of the freeze process, the flow comes to a step S7. At the step S7, a search for a next picture recorded five minutes later is made by fast feeding the tape 22. The flow then comes to a step S8.

At the step S8, an image,which corresponds to the image signal for one picture stored in the field memory 14 at the step S6 is printed on the printing paper 21. At a step S9, a check is made to find if the image for one picture has been completely printed. If so, the flow comes to a step S10 to feed the paper and set the ink head 18 in a position where the next picture is to be printed. This process of paper feeding is monitored at a step S11. Upon completion of the paper feeding process, the flow comes to a step S12 to confirm the lapse of time on the basis of the value of a tape counter of the VTR 1.

If the lapse of five minutes is confirmed at the step S12, the flow comes back to the step S5. If not, the flow proceeds to a step S13 to make a check for the last picture. The last picture can be found either when an unrecorded area of the tape 22 comes to show an unrecorded area or when the number of the printed pictures reaches the maximum number of pictures printable on one and the same sheet of the printing paper. In this case, the maximum number is 24 pictures (120/5=24).

If the result of the check made at the step S13 does not indicate the last picture, the flow comes back to the step S12. If the result of the check indicates the last picture, the flow proceeds to a step S14. At the step S14, the freeze action is performed on the last picture and the flow comes to a step S15 to have the tape 22 rewound back to the leader part thereof.

At a step S16, the last picture is printed. At a step S17, the ink head 18 is moved back to its home position. At a step S18, the printing paper 21 is delivered and one series of processes comes to an end.

After the ink head 18 is moved from the picture No. 1 to the picture No. 6 in the first column on the left side as shown in FIG. 3 and after the length of time elapsed is printed, with the title picture (picture No. 0) located at the datum position of the ink head 18 for the first column as shown in the middle part of FIG. 5, the ink head 18 is moved to the picture No. 7. In this instance, the printing paper 21 is fed reversely to the paper feeding direction for the pictures No. 1 to No. 6 in such a way as to have the picture No. 6 in alignment with the picture No. 1 in the direction of y axis. Further, the ink head 18 is moved to its datum position for the second column to prevent the pictures No. 1 to No. 6 from overlapping the pictures No. 7 to No. 12 and also to have them in alignment with each other in the direction of x axis.

The same operation is carried on to print all the pictures up to the picture No. 20 which is in the. fourth column. Meanwhile, the tape 22 is transported to have an image signal for each of the pictures No. 0 to No. 20 stored one after another in the field memory 14. For this purpose, normal reproduction and fast tape feeding are alternately carried out in a repeating manner. When the number of pictures comes to exceed the picture No. 20, a check is made for confirmation of the fact that there is no more picture recorded on the tape 22. The tape 22 is then rewound back to its leader position.

In the case of this embodiment, the printing action is performed while temporarily storing in the field memory 14 an image signal for one,picture recorded on the tape 22 at intervals of five minutes beginning with the leader part of the tape 22. The tape transporting action is repeatedly performed with the storing and printing action. After detection of the last picture, the operation shifts to the following.

With respect to the printing paper 21, a paper delivery work begins. With respect to the ink head 18, the ink head 18 is returned to its home position to wait for a next instruction and also to permit a maintenance process to be performed as necessary. Next, the tape 22 is rewound back to its leader part.

With the embodiment arranged to perform printing as described above, it gives the following advantages.

Since each of a plurality of pictures is dispersedly printed, each immediately after an image signal for one picture is stored in the memory 14, the waiting time as a whole can be reduced to enable the printing process to be finished in a short period of time.

Further, since the apparatus is set to carry out the storing action on the image signals at intervals of a predetermined period of time, the whole printing process can be arranged to be carried out in an automated manner.

A printing layout which is made in the case of this embodiment enables the operator to easily grasp the outline of the records in the order of time beginning with a title recorded on a video tape.

The printing action and the tape transporting action can be allowed to simultaneously proceed by just arranging the image memory of a capacity of one TV picture as a minimum necessary buffer memory between the VTR and the printer. The processing efficiency in terms of time can be greatly enhanced by this arrangement.

In a case where this invention is applied to a digital VTR, an image data compressing method such as a DCT (discrete cosine transform) method or the like is applied to the above-stated image memory, so that the memory operating efficiency can be further enhanced. An apparatus which is arranged according to this invention to print images obtained from a digital VTR is described below as a second embodiment of this invention.

Figure 7:
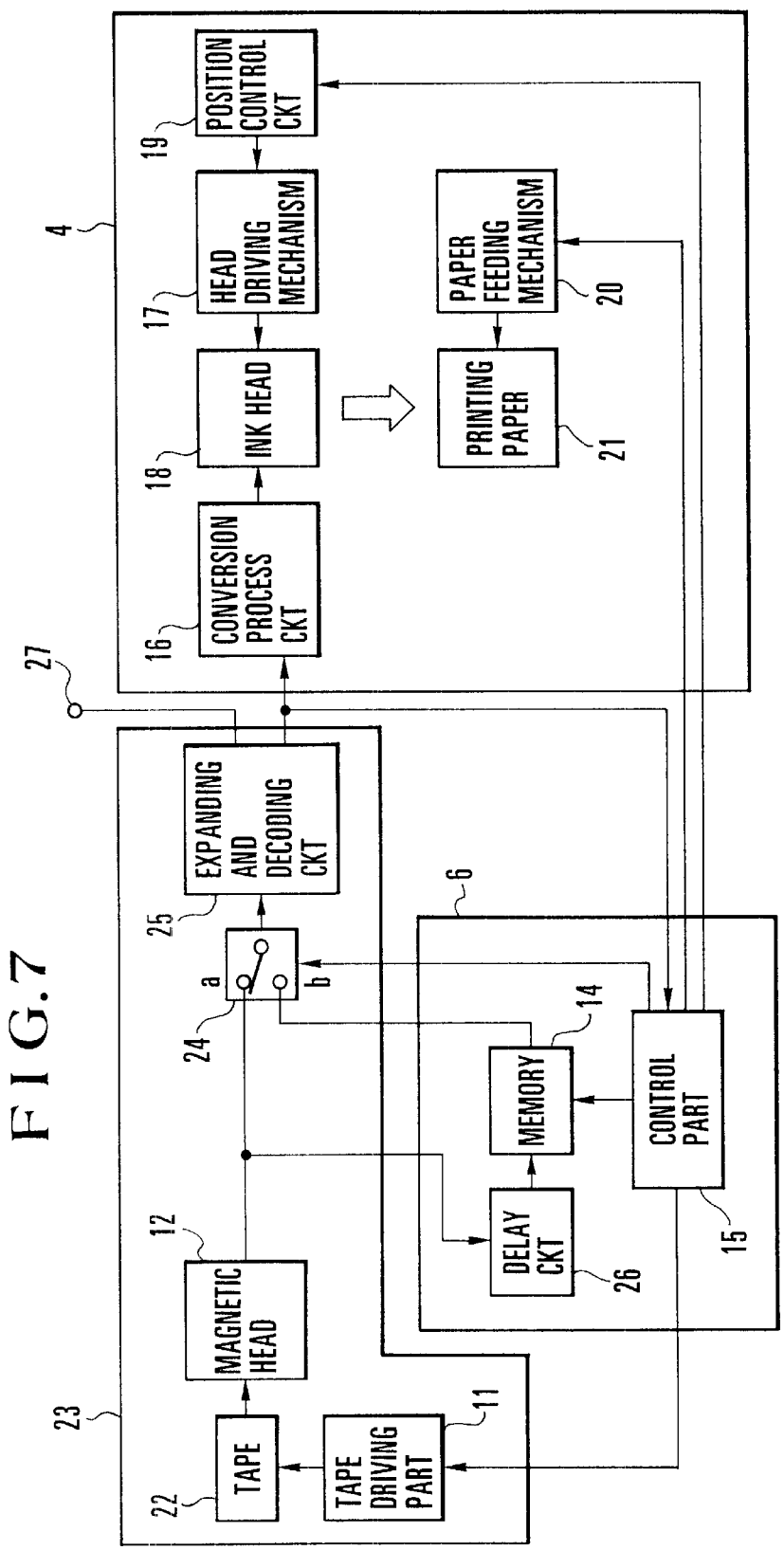
FIG. 7 is a block diagram showing the arrangement of an image outputting apparatus arranged as a second embodiment of this invention.

FIG. 7 shows in a block diagram the arrangement of an image outputting apparatus which is arranged as the second embodiment of this invention. In FIG. 7, the parts arranged in the same manner as those shown in FIG. 2 are indicated by the same reference numerals.

Figure 8:
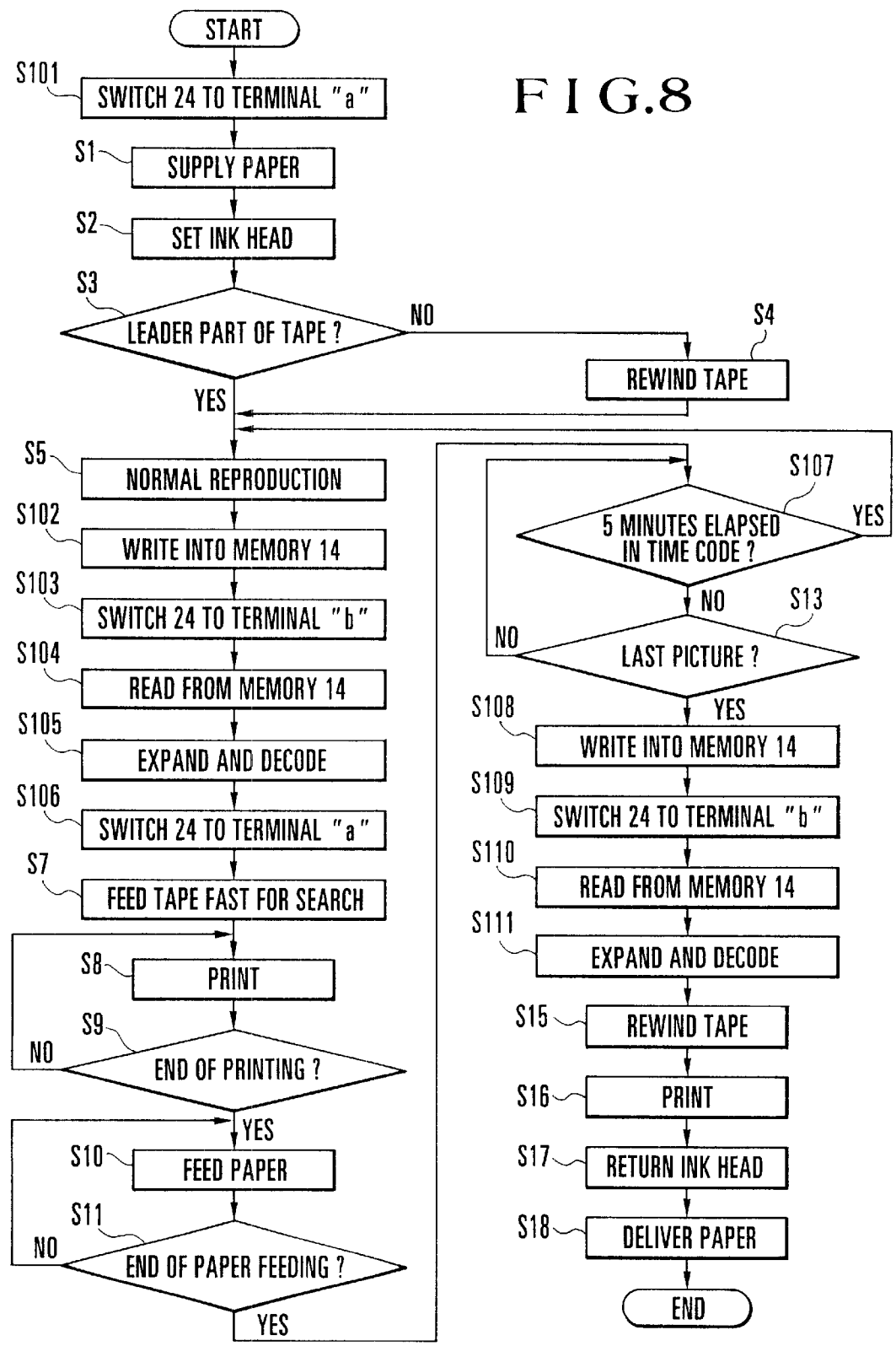
FIG. 8 is a flow chart showing the operation of the second embodiment of this invention.

Referring to FIG. 7, a digital VTR 23 is assumed to have a magnetic tape carrying thereon the record of image signals which have been digitized, DCT converted in a known manner, compressed and coded through processes such as a variable length coding processes, etc. The following describes the operation of the embodiment which is performed to reproduce and print the compressed and coded digital image signals with reference to FIG. 8 which is a flow chart.

In the first place, at a step S101, a switch 24 is connected to a terminal "a". The printing paper is supplied at the step S1. The flow of operation comes to the step S2 to set the ink head 18 at the printing area. At the step S3, the control part 15 makes a check to find if the tape 22 is at its leader part. If not, the control part 15 causes the tape 22 to be rewound up to the leader part. If so, the flow comes to the step S5 to perform control for normal reproduction without rewinding the tape 22.

At a step S102, a reproduced digital image signal for one picture is outputted and supplied, in a state of being compressed and coded, to the memory 14 via a delay circuit 26 which is arranged to have a delay time as will be described later herein. The digital signal is written into the memory 14. At a step S103, upon completion of writing, the switch 24 is connected to another terminal "b". At a step S104, the image signal is read out from the memory 14. At a step S105, an expanding and decoding circuit 25 expands and decodes the compressed and coded image signal read out from the memory 14. The image signal thus processed is supplied to the conversion process circuit 16. The control part 15 is arranged to have the image signal stored in the memory 14 continuously rewritten until it is detected that no more image signal is recorded on the tape 22 as will be described later.

Upon completion of writing the digital image signal for one picture into the memory 14, the control part 15 causes the tape 22 to begin to be transported. Then, at a step S106, upon completion of the expanding and decoding process on the image signal read out from the memory 14, the switch 24 is connected to the terminal "a". Then, a search reproduction process is performed by fast feeding the tape 22 at the step S7.

The flow then proceeds to the step S8 to print on the printing paper 21 an image corresponding to the image signal processed in the above-stated manner by the conversion process circuit 16. The processes of the steps S9 to S11 are then executed in the same manner as in the case of the first embodiment described in the foregoing.

At a step S107, upon completion of paper feeding at the step S11, the control part 15 makes a check for the lapse of time by making reference to a time code included in the reproduced signal obtained from the expanding and decoding circuit 25. If the lapse of five minutes is confirmed at the step S107, the flow comes back to the step S5. If not, the flow comes to the step S13 to make a check for the last picture. The last picture is confirmed either when images which are being outputted from the expanding and decoding circuit 25 in process of the search cease to be obtained or when the number of pictures printed on the printing paper has reached the maximum number of pictures printable on one sheet of paper. The disappearance of images in search is confirmable by the control part 15 through the reproduced image signals outputted from the expanding and decoding circuit 25.

If the result of the check made at the step S13 does not indicate the last picture, the flow comes back to the step S107. If it indicates the last picture, the flow comes to a step S108. At the step S108, the image signal for the last picture is written into the memory 14. In this instance, the delay circuit 26 is set at a sufficient length of delay time to permit the control part 15 to confirm that there is no longer any reproduced signal. Therefore, since the image signal to be inputted to the memory 14 is obtained through the delay circuit 26 as mentioned above, the timing of the image signal input is a little delayed from the timing of an image signal inputted to the expanding and decoding circuit 25 through the switch 24. Therefore, after confirmation of no more reproduced image signal, the control part 15 does not rewrite the image signal stored in the memory 14 and allows it to be outputted and supplied to the expanding and decoding circuit 25 as the last picture.

At a step S109, the switch 24 is connected to the terminal "b". At a step S110, the image signal for one picture is read out from the memory 14. At a step S111, the image signal thus read out is decoded by the expanding and decoding circuit 25. The decoded image signal is supplied to the conversion process circuit 16. Further, after completion of writing the image signal for the last picture into the memory 14, the control part 15 performs control to rewind the tape 22 at the step S15.

At the step S16, the last picture is printed on the printing paper 21. At the step S17, the ink head 18 is moved back to its home position. At the step S18, the printing paper 21 is delivered and a series of processes comes to an end. Further, in a case where no printing is performed with the printer, the reproduced image signal outputted from the expanding and decoding circuit 25 is outputted from an output terminal 27.

As described above, the second embodiment is arranged such that, even in a case where the image signal reproduced by a digital VTR is to be printed by a printer, advantageous effects can be obtained in the same manner as in the case of the first embodiment. Further, the memory 14 can be arranged to have a much smaller capacity by just including a delay circuit which has some delay time.

Each of the embodiments described is arranged to control the tape to be transported to a predetermined position, to print on the printing paper an image corresponding to the image signal reproduced from the tape while setting the paper in a predetermined position. These actions are repeatedly performed to record a plurality of images on one and the same sheet of printing paper. The arrangement described above not only enables the embodiment to record a plurality of images directly on the printing paper without necessitating use of such memory means as a page buffer or the like but also permits reduction in the capacity of the image memory. Further, the image outputting apparatus arranged as described above according to this invention permits the arrangement to shorten the length of processing time necessary in printing a plurality of images.

What is claimed is:
1. An image outputting apparatus comprising:
   a) reproduction means for reproducing image signals;
   b) mode change-over means for changing over operation modes of said production means;
   c) printing means for printing images represented by the image signals reproduced by said reproduction means on a recording substance by using a printing head, said printing means having a memory for one picture; and
   d) control means for controlling a change-over of the operation modes by said mode change-over means and a positional relation between the printing head and the recording substance in an interlocking manner;
   wherein said control means changes said operation modes in accordance with said positional relation that the head moves outside a printing area of the recording substance and changes the operation mode in association with the printing of one picture by the printing means and wherein said printing means has a memory capac- ity smaller than a capacity of a single picture plane to be printed by said printing means.

2. An apparatus according to claim 1, wherein said mode change-over means is arranged to switch a reproducing operation of said reproduction means between a first mode in which a reproducing speed of said reproduction means corresponds to a recording speed employed at the time of recording and a second mode in which the reproducing speed does not correspond to the recording speed.

3. An apparatus according to claim 1, wherein said printing means is arranged to print oh the recording substance an image corresponding to an image signal for one picture included in the image signals.

4. An apparatus according to claim 1, wherein said operation modes include modes having different reproduction speeds.

5. An apparatus according to claim 1, wherein said operation modes include a mode having higher reproduction speed than an ordinary reproduction speed.

6. An image outputting apparatus comprising:
 a) input means for inputting image signals from a reproducing apparatus adapted to reproduce the image signals;
 b) printing means for printing images represented by the image signals inputted by said input means on a recording substance by using a printing head, said printing means having a memory for one picture; and
 c) control means for controlling a change-over of operation modes of the reproducing apparatus and a positional relation between the printing head and the recording substance in an interlocking manner;
 wherein said control means changes said operation modes in accordance with said positional relation that the head moves outside a printing area of the recording substance and changes the operation mode in association with the printing of one picture by the printing means and wherein said printing means has a memory capacity smaller than a capacity of a single picture plane to be printed by said printing means.

7. An apparatus according to claim 6, wherein said control means is arranged to switch the operation modes of the reproducing apparatus between a first mode in which a reproduction speed for the image signals corresponds to a recording speed employed at the time of recording and a second mode in which the reproduction speed does not correspond to the recording speed.

8. An apparatus according to claim 6, wherein said printing means includes feeding means for feeding the recording substance, and wherein said control means is arranged not only to switch the operation modes of the reproducing apparatus but also to control said feeding means to feed the recording substance to a predetermined position so as to shift a recording position on the recording substance.

9. An apparatus according to claim 6, wherein said operation modes include modes having different reproduction speeds.

10. An apparatus according to claim 6, wherein said operation modes include a mode having higher reproduction speed than an ordinary reproduction speed.

11. An image reproducing apparatus comprising:
 a) reproduction means for reproducing image signals.
 b) mode change-over means for changing over operation modes of said reproduction means;
 c) output means for outputting the image signals reproduced by said reproduction means to a printing apparatus adapted to print the image signals on a recording substance by using a printing head, said output means having a memory for one picture; and
 d) control means for controlling a change-over of the operation modes by said mode change-over means and a positional relation between the printing head and the recording substance in an interlocking manner;
 wherein said control means changes said operation modes in accordance with said positional relation that the head moves outside a printing area of the recording substance and changes the operation mode in association with the printing of one picture by the printing apparatus and wherein said output means has a memory capacity smaller than a capacity of a single picture plane to be printed by said printing apparatus.

12. An apparatus according to claim 11, wherein said mode change-over means is arranged to switch a reproducing operation of said reproduction means between a first mode in which a reproducing speed of said reproduction means corresponds to a recording speed employed at the time of recording and a second mode in which the reproducing speed does not correspond to the recording speed.

13. An apparatus according to claim 11, wherein said printing apparatus includes feeding means for feeding the recording substance, and wherein said control means is arranged not only to switch the operation modes of said reproduction means but also to control said feeding means to feed the recording substance to a predetermined position so as to shift a recording position on the recording substance.

14. An apparatus according to claim 11, wherein said operation modes include modes having different reproduction speeds.

15. An apparatus according to claim 11, wherein said operation modes include a mode having higher reproduction speed than an ordinary reproduction speed.

16. A method of outputting an image, comprising the steps of:
 a) reproducing image signals by reproduction means;
 b) changing over operation modes of said reproduction means;
 c) printing images represented by the reproduced image signals on a recording substance by using a printing head and a memory for one picture; and
 d) controlling said changing over of the operation modes and a positional relation between the printing head and the recording substance in an interlocking manner and changes over the operation mode in association with the printing of one picture by printing means;
 wherein said operation modes are changed in accordance with said positional relation that the head moves outside a printing area of the recording substance and wherein said printing means has a memory capacity smaller than a capacity of a single picture plane to be printed by said printing means.

17. A method according to claim 16, wherein said operation modes are changed over from a first mode in which a reproducing speed of said reproduction means corresponds to a recording speed employed at the time of recording and a second mode in which the reproducing speed does not correspond to the recording speed.

18. A method according to claim 16, wherein said printing step includes printing on the recording substance an image corresponding to an image signal for one picture included in the reproduced signals.

19. A method according to claim 16, wherein said operation modes include modes having different reproduction speeds.

20. A method according to claim 16, wherein said operation modes include a mode having higher reproduction speed than an ordinary reproduction speed.

21. A method of outputting an image, comprising the steps of:
   a) inputting image signals from a reproducing apparatus adapted to reproduce the image signals;
   b) printing images represented by the inputted image signals on a recording substance by using a printing head and a memory for one picture; and
   c) controlling a change-over of operation modes of the reproducing apparatus and a positional relation between the printing head and the recording substance in an interlocking manner and changes over the operation mode in association with the printing of one picture by printing means;
   wherein said operation modes are changed in accordance with said positional relation that the head moves outside a printing area of the recording substance and wherein said printing means has a memory capacity smaller than a capacity of a single picture plane to be printed by said printing means.

22. A method according to claim 21, wherein said operation modes are changed over from a first mode in which a reproducing speed of said reproduction apparatus corresponds to a recording speed employed at the time of recording and a second mode in which the reproducing speed does not correspond to the recording speed.

23. A method according to claim 21, wherein said printing step includes printing on the recording substance an image corresponding to an image signal for one picture included in the inputted signals.

24. A method according to claim 21, wherein said operation modes include modes having different reproduction speeds.

25. A method according to claim 21, wherein said operation modes include a mode having higher reproduction speed than an ordinary reproduction speed.

26. A method of reproducing an image, comprising the steps of:
   a) reproducing image signals by reproduction means;
   b) changing over operation modes of said production means;
   c) outputting the reproduced image signals to a printing apparatus adapted to print the image signals on a recording substance by using a printing head and a memory for one picture; and
   d) controlling said changing over of the operation modes and a positional relation between the printing head and the recording substance in an interlocking manner and changes over the operation mode in association with the printing of one picture by printing means;
   wherein said operation modes are changed in accordance with said positional relation that the head moves outside a printing area of the recording substance and wherein said printing means has a memory capacity smaller than a capacity of a single picture plane to be printed by said printing means.

27. A method according to claim 26, wherein said operation modes are changed over from a first mode in which a reproducing speed of said reproduction means corresponds to a recording, speed employed at the time of recording and a second mode in which the reproducing speed does not correspond to the recording speed.

28. A method according to claim 26, wherein said outputting step includes outputting to the printing apparatus an image corresponding to an image signal for one picture included in the reproduced image signals.

29. A method according to claim 26, wherein said operation modes include modes having different reproduction speeds.

30. A method according to claim 26, wherein said operation modes include a mode having higher reproduction speed than an ordinary reproduction speed.

* * * * *

UNITED STATES PATENT AND TRADEMARK OFFICE
CERTIFICATE OF CORRECTION

PATENT NO. : 6,445,871 B1  Page 1 of 1
DATED : September 3, 2002
INVENTOR(S) : Koji Takahashi et al.

It is certified that error appears in the above-identified patent and that said Letters Patent is hereby corrected as shown below:

Column 2,
Line 50, delete "drawings,." and insert -- drawings: --.

Column 3,
Line 59, before "Procedures for" insert a new paragraph.

Column 4,
Line 14, delete "printing-is" and insert -- printing is --.
Line 19, delete "minutes,." and insert -- minutes, --.

Column 6,
Line 17, delete "one,picture" and insert -- one picture --.

Column 9,
Line 11, delete "oh" and insert -- on --.

Signed and Sealed this

Thirtieth Day of September, 2003

JAMES E. ROGAN
*Director of the United States Patent and Trademark Office*